US 6,638,034 B2

(12) United States Patent  
Gegalski

(10) Patent No.: US 6,638,034 B2  
(45) Date of Patent: Oct. 28, 2003

(54) PUMPING SET FOR AN ABS/ASR/VSC BRAKE SYSTEM

(75) Inventor: Helmut Gegalski, Mülheim-Kärlich (DE)

(73) Assignee: Lucas Varity GmbH (DE)

( * ) Notice: Subject to any disclaimer, the term of this patent is extended or adjusted under 35 U.S.C. 154(b) by 0 days.

(21) Appl. No.: 10/023,201

(22) Filed: Dec. 13, 2001

(65) Prior Publication Data

US 2002/0102168 A1 Aug. 1, 2002

Related U.S. Application Data

(63) Continuation of application No. PCT/EP00/05521, filed on Jun. 15, 2000.

(30) Foreign Application Priority Data

Jun. 16, 1999 (DE) .......................... 199 27 454

(51) Int. Cl.$^7$ ............... F04B 17/00; F04B 35/04
(52) U.S. Cl. ............ 417/415; 417/313; 303/116.4; 92/86
(58) Field of Search ............ 417/415.313, 360.273, 417/410.1; 303/113.1, 115.2, 116.3, 116.4; 92/72, 86, 129

(56) References Cited

U.S. PATENT DOCUMENTS 5,009,581 A * 4/1991 Kushiyama et al. ........ 417/540
5,039,283 A * 8/1991 Mergenthaler et al. ..... 417/273
5,620,311 A * 4/1997 Wetzel ....................... 417/415
5,658,056 A * 8/1997 Rischen et al. ........... 303/119.2
5,716,111 A * 2/1998 Schenk et al. ........... 303/116.4
5,895,207 A * 4/1999 Burgdorf et al. ......... 417/410.1
6,142,751 A 11/2000 Krauter et al. ............. 417/415

FOREIGN PATENT DOCUMENTS

| DE | 2146079 | 3/1973 |
| DE | 3232083 | 3/1984 |
| DE | 19709776 | 9/1998 |
| DE | 19805101 | 8/1999 |
| EP | 882632 | 12/1998 |
| WO | 97/48583 | 12/1997 |

* cited by examiner

Primary Examiner—Charles G. Freay  
Assistant Examiner—Han Lieh Liu  
(74) Attorney, Agent, or Firm—MacMillan, Sobanski & Todd, LLC

(57) ABSTRACT

The pumping set comprises an electric motor (10), the output shaft (12) of which is drivingly connected to a piston pump arrangement (14) for delivering hydraulic fluid. To prevent hydraulic fluid, which escapes at the piston pump arrangement (14) during operation, from passing into the interior (39) of the electric motor (10), a collecting region (30) is provided, which is connected to a storage chamber (36) in order to receive hydraulic fluid therein.

11 Claims, 2 Drawing Sheets

PUMPING SET FOR AN ABS/ASR/VSC BRAKE SYSTEM

CROSS REFERENCE TO RELATED APPLICATIONS

This application is a continuation of International Application No. PCT/EP00/05521 filed Jun. 15, 2000, which claims priority to German Patent Application No. 19927454.1 filed Jun. 16, 1999.

BACKGROUND OF THE INVENTION

The present invention relates to a pumping set in particular for an ABS/ASR/VSC brake system (antilock braking system/automatic slip regulation/vehicle stability control system) for off-road vehicles.

From WO 97/48583 a radial piston pump is known, having an electric motor which drives a piston pump arrangement. To keep any leaking hydraulic fluid away from the electric is motor, in the housing of the piston pump arrangement collecting chambers and channels are formed, into which leaking hydraulic fluid passes under the action of gravitational and/or centrifugal force in order to be stored there. Disposed between the electric motor and the piston pump arrangement is an open rolling-contact bearing and disposed at the side of the rolling-contact bearing facing the electric motor is a slinger, which is driven by the electric motor. Leaking hydraulic fluid, after it has passed through the open rolling-contact bearing, is kept away from the electric motor by means of the slinger. Said radial piston pump may be installed only with a horizontal orientation (with the electric motor next to the piston pump arrangement) or with a vertical orientation such that the electric motor is disposed above the piston pump arrangement, for, if the radial piston pump were to be installed with the electric motor below the piston pump arrangement, the hydraulic fluid under the action of gravitational force alone would flow out of the collecting chambers and the channels into the electric motor, particularly when the electric motor was stopped and the slinger was not driven.

With such pumping sets there is also the problem that because of temperature variations between the interior of the electric motor and the space, in which the eccentric pump arrangement is situated, a (short-term) differential pressure of up to 2 bar may arise. As a result, excess hydraulic fluid is sucked out of the space, in which the leakage of the eccentric pump arrangement is situated, through the ball bearing or needle bearing for the output shaft and into the interior of the electric motor. Particularly in the event of extended operating times of the pumping set (due to operation of a vehicle stability control system), a significant quantity of hydraulic fluid may escape and be drawn into the electric motor by a vacuum, which arises in the electric motor as a result of short-term cooling (caused by splash-water getting onto the electric motor) in the interior of the electric motor.

Conventional sealing methods (sealing rings, sealed bearings etc.) are too expensive and also do not prevent the hydraulic fluid from being dispersed into the environment.

Thus, the arrangement is also not immersion-proof (e.g. for off-road vehicles).

SUMMARY OF THE INVENTION

The invention seeks to solve the problem of achieving optimum utilization of the installation space in a vehicle and in particular of overcoming the drawbacks described above.

To solve said problem, the invention proposes a pumping set, in particular for an ABS/ASR/VSC brake system.

The storage chamber disposed according to the invention in a pumping set may store hydraulic fluid which escapes from the piston even when the pumping set is disposed with the electric motor below the piston pump arrangement. The pumping set according to the invention may therefore also be installed in said position into a vehicle. The installation space in the vehicle may therefore be utilized to better effect.

In a preferred embodiment, the electric motor in its end region facing the piston pump arrangement has a recess, which forms the storage chamber.

In the radial piston pump described in WO 97/48583 all of the channels and collecting chambers are formed in the housing of the piston pump arrangement. In contrast, according to the invention a dead space in the electric motor may be used as a storage chamber, thereby reducing the total volume of the pumping set.

To prevent hydraulic fluid from running out of the storage chamber in the event of shaking of the pumping set (due to operation of the motor vehicle under rough conditions), the storage chamber is at least partially filled with a material which absorbs hydraulic fluid.

In a preferred embodiment of the invention, the storage chamber surrounds the output shaft of the electric motor at least in the shape of graduated circle.

In an identical manner, the collecting region preferably at least partially surrounds the output shaft of the electric motor.

By virtue of said arrangement it is ensured that hydraulic fluid escaping from the pump arrangement passes reliably into the collecting region and from there into the storage chamber.

In a currently preferred embodiment, the output shaft of the electric motor is additionally provided with a centrifugal body, which is non-rotatably connected to the output shaft and is in such a spatial relationship to the piston pump arrangement that hydraulic fluid escaping from the piston pump arrangement during operation may pass onto the centrifugal body in order to be slung by the latter into the collecting region. This prevents hydraulic fluid from being able to pass along the output shaft (through the bearing situated in the end region of the electric motor) into the interior of the electric motor.

The pumping unit is moreover devised so as to be disposed with a substantially vertically oriented output shaft in a motor vehicle, wherein a slight inclination of up to around 25°, preferably of up to around 15° in the direction of the collecting region may be provided. Said measure also ensures that hydraulic fluid escaping from the pump arrangement does not pass into regions outside of the collecting region or the storage chamber.

When according to a preferred embodiment the interior of the electric motor is connected to the piston pump arrangement by a vent opening, which is situated in the end region facing the piston pump arrangement, to the piston pump arrangement, a pressure compensation between said two regions may easily occur. Thus, the electric motor is moreover immersion-proof and suitable for installation in the engine compartment of a motor vehicle.

BRIEF DESCRIPTION OF THE DRAWINGS

Further properties, advantages, features and possible variations of the invention are explained in the following description of a currently preferred embodiment of the invention with reference to the drawings.

DETAILED DESCRIPTION OF THE EMBODIMENT

Figure 1:
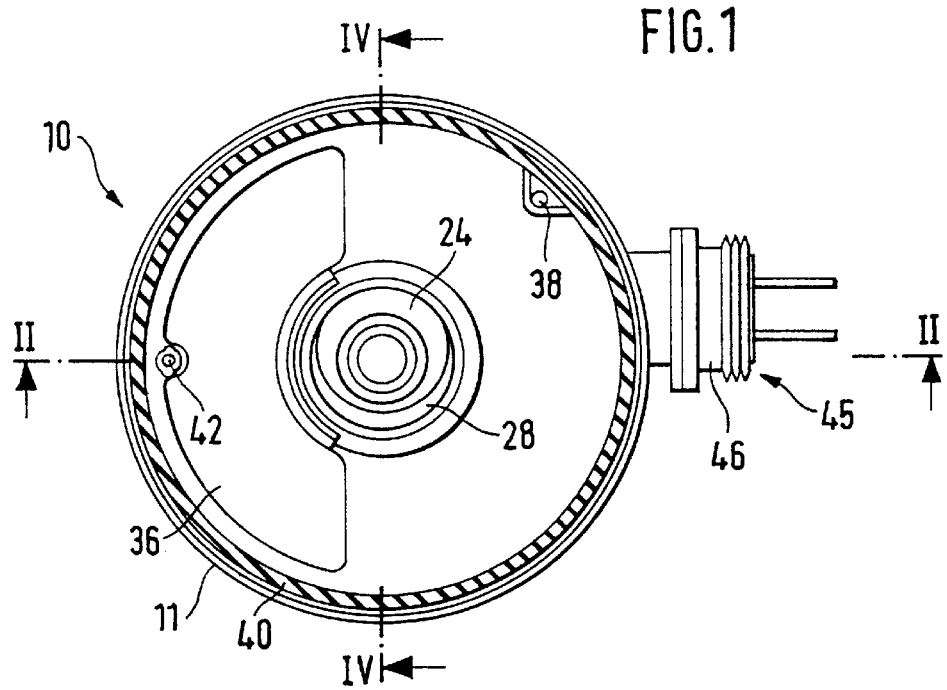
FIG. 1 a diagrammatic plan view of a pumping set according to the invention, from which the piston pump arrangement has been removed, FIG. 2 the section denoted by II—II in FIG. 1, FIG. 3 the section denoted by III—III in FIG. 2 and FIG. 4 the section denoted by IV—IV in FIG. 1.
Figure 2:
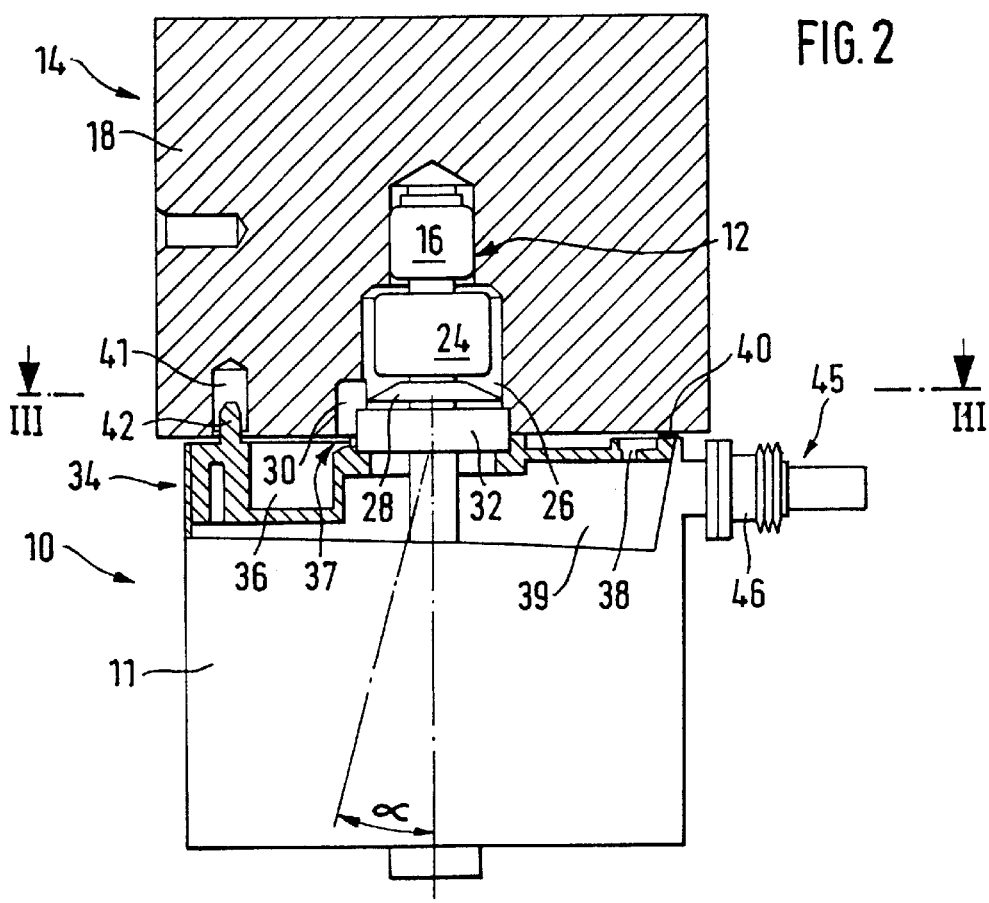
Figure 3:
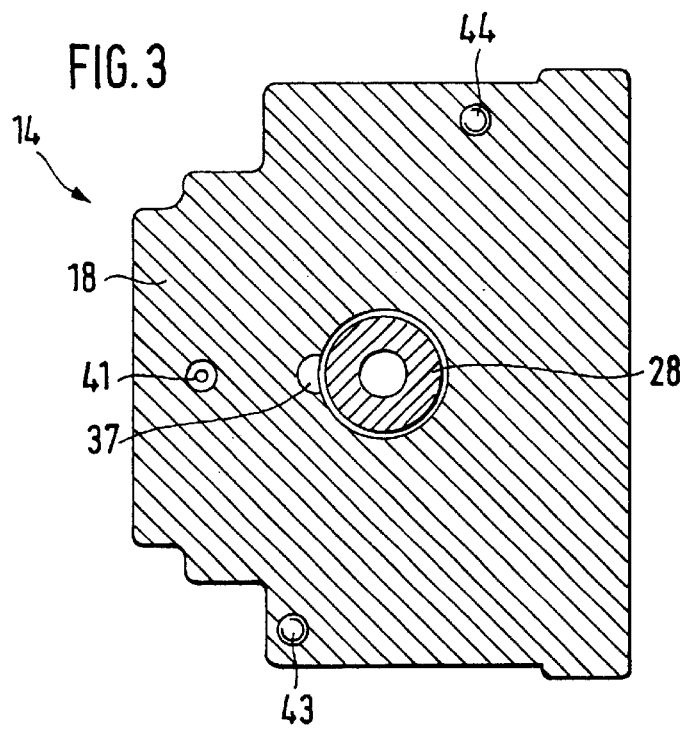
Figure 4:
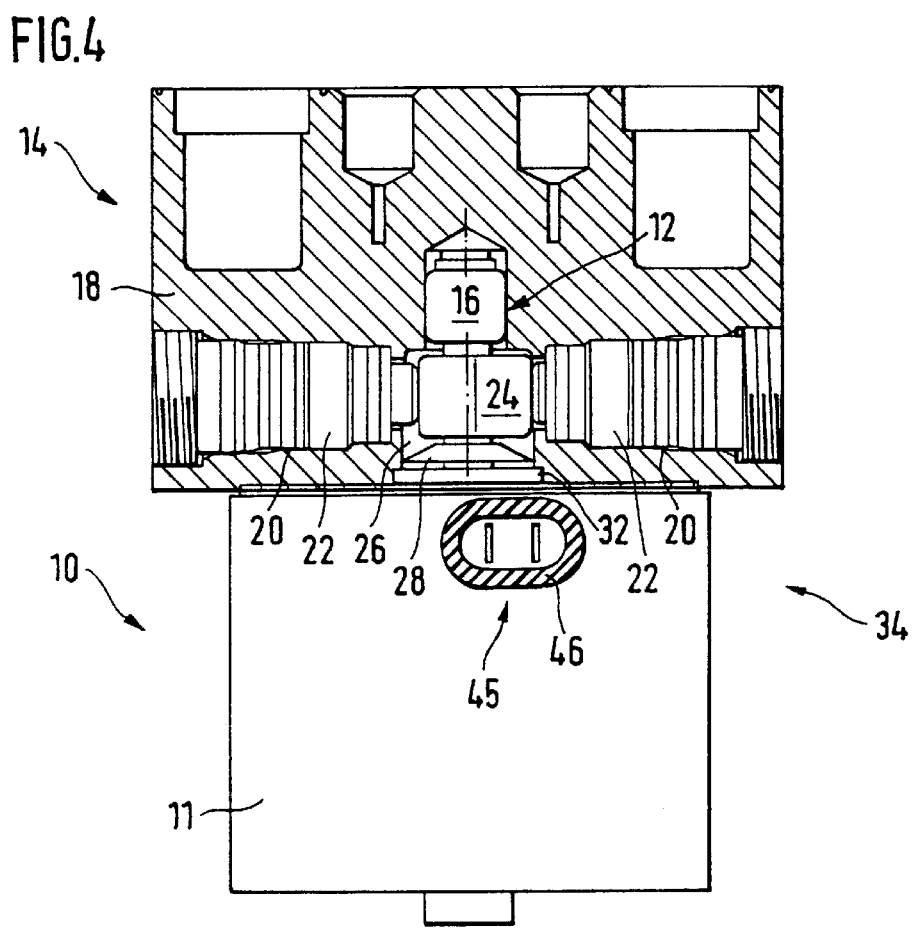

The pumping set comprises an electric motor 10 having a substantially cylindrical motor housing 11, from which an output shaft 12 projects, in relation to FIGS. 2 and 4, vertically into a piston pump arrangement 14. The output shaft 12 is rotatably supported by a bearing 16 in a pump housing 18 of the piston pump arrangement 14. The pump housing 18 has two, in relation to FIG. 4, horizontally aligned guides 20, in each of which a piston 22 is slidingly displaceable. The pistons 22 are biased towards an eccentric cam 24, which is non-rotatably coupled to the output shaft 12. When the output shaft 12 is rotated by the electric motor 10, each of the pistons 22 is axially displaced by the cam 24 and therefore delivers hydraulic fluid.

During operation of the piston pump arrangement 14 a small quantity of hydraulic fluid may escape between the guides 20 and the pistons 22. Said escaping hydraulic fluid passes into a space 26, which surrounds the cam 24.

In order to achieve optimum utilization of the installation space in a vehicle, the electric motor 10 is installed in the vehicle in the illustrated manner below the piston pump arrangement 14 and with the output shaft 12 substantially vertical. In said case, however, there is a danger that the hydraulic fluid escaping at the piston 22 will pass vertically down along the output shaft 12 into the housing 11 of the electric motor 10 and lead to corrosion and fouling there. To prevent this, a taper-disk-shaped centrifugal body 28, onto which the escaping hydraulic fluid may pass, is non-rotatably mounted on the output shaft 12 below the cam 24. During operation of the piston pump arrangement 14 the centrifugal body 28 rotates with the output shaft 12 and conveys the escaping hydraulic fluid in a radially outward direction.

Between the pump housing 18 and the output shaft 12 a collecting region 30 is formed radially outside of the space 26. The centrifugal body 28 conveys the hydraulic fluid into said receiving region 30 and therefore prevents the hydraulic fluid from passing through a bearing 32, which is disposed at the end of the motor housing 11 facing the piston pump arrangement 14.

Vertically below the collecting region 30 a recess in the end region 34 of the motor housing 11 forms a storage chamber 36 in the shape of a graduated circle, which partially surrounds the output shaft 12. The storage chamber 36 is connected to the collecting region 30 by a fluid line 37, which here takes the form of a bore. As the bore 37 cuts the space 26 about the output shaft 12, the region of the bore 37 situated at the level of the space 26 acts as collecting region 30. Hydraulic fluid, which is slung or flows into said region, passes through the bore 37 acting as a flow channel into the storage chamber 36. The hydraulic fluid, which has passed into the collecting region 30, therefore flows as a result of gravitational force into the storage chamber 36. The volume of the storage chamber 36 is so dimensioned that it may accommodate all of the hydraulic fluid which escapes at the piston 22 throughout the life of the pumping set.

To improve the downward flow of the hydraulic fluid into the storage chamber 36, in the illustrated embodiment the pumping set is arranged so as to be not exactly vertical but inclined at an angle a of around 15° in the direction of the storage chamber 36.

While the vehicle is in operation, the brake system and in particular the pumping set is subjected to shocks and vibrations, which may lead to stored hydraulic fluid flowing out of the storage chamber 36, through the fluid line 37 and the collecting region 30 to the bearing 32. To prevent hydraulic fluid from flowing out, a material (not shown) which absorbs hydraulic fluid, such as e.g. a felt disk, is disposed at least partially in the storage chamber 36. The absorbent material may be formed only at the fluid line 37 or in the entire volume of the storage chamber 36.

The storage chamber 36 may be closed by a separate lid (not shown) or, as is shown in FIG. 2, may in the assembled state of the pump housing 18 be covered directly by the latter. In said case, the storage chamber 36 may be additionally sealed off from the pump housing 18 by an annular seal (not shown), which is disposed around the storage chamber 36 at the end face of the motor housing 11. Alternatively, the storage chamber 36 may also be formed in the pump housing 18.

At the end of the motor housing 11 facing the pump housing 18 a ventilation bore 38 is formed in the radially opposite side to the collecting region 30, close to the outer periphery and offset in direction of rotation by an angle of around 20°, and enables a pressure compensation between the interior 39 of the motor housing 11 and the space 26 in the pump housing 18. The ventilation bore 38 is disposed at a maximum distance from the collecting region 30 so that a possible flow of hydraulic fluid out of the collecting region 30 into the ventilation bore 38 is made even more difficult because of the large distance between the collecting region 30 and the ventilation bore 38.

An annular seal 40 is moreover cast integrally on the end of the motor housing 11, at the periphery of the latter, and effects sealing between the motor housing 11 and the pump housing 18. The pump housing 18 is aligned relative to the motor housing 11 by means of a recess 41 and a positioning pin 42, which is disposed on the motor housing 11, and fastened by two screws 43 and 44 to the motor housing 11. Provided at the outer peripheral surface of the motor housing 11 is a connector 45, which projects outwards and is sealed by means of a seal 46. By virtue of the annular seal 40 and the seal 46 the pumping set is immersion-proof and may therefore be installed also in the engine compartment of an off-road vehicle, for example.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Pumping set in particular for an ABS/ASR/VSC brake system, comprising:
    an electric motor, an output shaft of which is connected to a piston pump arrangement for delivering hydraulic fluid,
    a collecting region for hydraulic fluid escaping during operation from the piston pump arrangement, which collecting region is connected to a storage chamber in order to receive hydraulic fluid therein, wherein
    in the installed position of the pumping set the electric motor and the piston pump arrangement are oriented in such a way that the electric motor is situated gravitationally below the piston pump arrangement, characterized in that the output shaft is drivingly connected to the piston pump arrangement, the storage chamber is situated gravitationally below the collecting region, and the electric motor in its end region facing the piston pump arrangement has a recess, which forms the storage chamber.

2. Pumping set in particular for an ABS/ASR/VSC brake system according to claim 1, characterized in that the storage chamber is at least partially filled with a material which absorbs hydraulic fluid.

3. Pumping set in particular for an ABS/ASR/VSC brake system according to claim 1, characterized in that the storage chamber is disposed so as to surround the output shaft of the electric motor at least in the shape of a graduated circle.

4. Pumping set in particular for an ABS/ASR/VSC brake system according to claim 1, characterized in that the collecting region at least partially surrounds the output shaft of the electric motor.

5. Pumping set in particular for an ABS/ASR/VSC brake system according to claim 1, characterized in that the output shaft of the electric motor is provided with a centrifugal body, which is non-rotatably connected to the output shaft and is in such a spatial relationship to the piston pump arrangement that hydraulic fluid, which escapes from the piston pump arrangement during operation, may pass onto the centrifugal body in order to be slung by the latter into the collecting region.

6. Pumping set in particular for an ABS/ASR/VSC brake system according to claim 5, characterized in that a bearing is disposed at the end of the electric motor facing the piston pump arrangement, and the centrifugal body is disposed above the bearing when the pumping set is disposed with the electric motor below the piston pump arrangement.

7. Pumping set in particular for an ABS/ASR/VSC brake system according to claim 5, characterized in that the centrifugal body is in the shape of a taper disk.

8. Pumping set in particular for an ABS/ASR/VSC brake system according to claim 6, characterized in that the centrifugal body is in the shape of a taper disk.

9. Pumping set in particular for an ABS/ASR/VSC brake system according to claim 1, characterized in that the pumping set is devised so as to be disposed with a substantially vertically oriented output shaft in a motor vehicle, wherein a slight inclination of up to around 25°, preferably up to around 15° in the direction of the collecting region may be provided.

10. Pumping set in particular for an ABS/ASR/VSC brake system according to claim 1, characterized in that an interior of the electric motor is connected to the piston pump arrangement by a ventilation bore, which is situated in an end region facing the piston pump arrangement, to a space surrounding the output shaft in the piston pump arrangement.

11. Pumping set in particular for an ABS/ASR/VSC brake system according to claim 1, characterized in that the output shaft is surrounded in the region of the piston pump arrangement by a free space, which is adjoined by a flow channel to the storage chamber, wherein a part of the flow channel is designed as collecting region.

* * * * *